United States Patent
Wu (10) Patent No.: US 11,729,830 B2
(45) Date of Patent: Aug. 15, 2023

(54) METHOD FOR TRANSMITTING INFORMATION BASED ON CHANNEL ACCESS MANNERS, AND USER EQUIPMENT

(71) Applicant: GUANGDONG OPPO MOBILE TELECOMMUNICATIONS CORP., LTD., Guangdong (CN)

(72) Inventor: Zuomin Wu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/336,660

(22) Filed: Jun. 2, 2021

(65) Prior Publication Data

US 2021/0298080 A1 Sep. 23, 2021

Related U.S. Application Data

(63) Continuation of application No. PCT/CN2019/098755, filed on Jul. 31, 2019.

(51) Int. Cl.
*H04W 74/08* (2009.01)
*H04L 27/26* (2006.01)
(Continued)

(52) U.S. Cl.
CPC ... *H04W 74/0816* (2013.01); *H04L 27/26025* (2021.01); *H04W 72/1263* (2013.01); *H04W 74/008* (2013.01)

(58) Field of Classification Search
CPC ......... H04W 74/0816; H04W 74/0825; H04W 74/08; H04W 74/0808; H04W 74/008; H04W 72/1263; H04L 27/26025
See application file for complete search history.

(56) References Cited

U.S. PATENT DOCUMENTS

2017/0196020 A1* 7/2017 Mukherjee .......... H04W 74/004
2017/0280475 A1   9/2017 Yerramalli et al.
(Continued)

FOREIGN PATENT DOCUMENTS

CN   107026724 A   8/2017
CN   107318171 A   11/2017
(Continued)

OTHER PUBLICATIONS

International Search Report in the international application No. PCT/CN2019/098755, dated Apr. 13, 2020.
(Continued)

*Primary Examiner* — Un C Cho
*Assistant Examiner* — Lalita W Pace
(74) *Attorney, Agent, or Firm* — Perkins Coie LLP (57) ABSTRACT

A method for transmitting information is disclosed, which includes that: User Equipment (UE) receives first indication information from a network device, the first indication information being used to determine at least one channel access manner in Channel Occupancy Time (COT) of the network device; and the UE determines a first channel access manner for a target burst in the COT according to the first indication information, the target burst being used to transmit a target signal or a target channel.

21 Claims, 4 Drawing Sheets

(51) Int. Cl.
*H04W 72/1263* (2023.01)
*H04W 74/00* (2009.01)

(56) References Cited

U.S. PATENT DOCUMENTS

| | | | |
|---|---|---|---|
| 2018/0115347 A1 | 4/2018 | Yerramalli et al. | |
| 2018/0124755 A1* | 5/2018 | Huang | H04W 72/0413 |
| 2019/0014596 A1* | 1/2019 | Yang | H04W 72/085 |
| 2019/0037582 A1 | 1/2019 | Noh et al. | |
| 2019/0045544 A1 | 2/2019 | Wang et al. | |
| 2019/0053222 A1 | 2/2019 | Bhorkar et al. | |
| 2019/0075581 A1* | 3/2019 | Salem | H04W 74/006 |
| 2019/0150170 A1* | 5/2019 | Park | H04W 74/08 370/329 |
| 2019/0174548 A1* | 6/2019 | Jiang | H04W 72/0446 |
| 2019/0200386 A1 | 6/2019 | Yang et al. | |
| 2019/0342915 A1* | 11/2019 | Kim | H04W 72/0446 |
| 2019/0387546 A1* | 12/2019 | Li | H04L 27/26025 |
| 2020/0008241 A1 | 1/2020 | Zhou | |
| 2020/0022174 A1* | 1/2020 | Karaki | H04W 72/0453 |
| 2020/0178297 A1* | 6/2020 | Park | H04W 74/0808 |
| 2020/0229227 A1* | 7/2020 | Babaei | H04L 5/0082 |
| 2020/0329493 A1 | 10/2020 | Yang et al. | |
| 2020/0337086 A1 | 10/2020 | Park et al. | |
| 2020/0351056 A1* | 11/2020 | Oh | H04W 72/042 |
| 2020/0359411 A1* | 11/2020 | Li | H04W 16/14 |
| 2020/0374933 A1* | 11/2020 | Lou | H04W 74/006 |
| 2021/0007115 A1 | 1/2021 | Noh et al. | |
| 2021/0022157 A1* | 1/2021 | Sun | H04W 72/1289 |
| 2021/0235478 A1 | 7/2021 | Karaki et al. | |
| 2021/0289548 A1* | 9/2021 | Murray | H04W 74/0808 |
| 2022/0174735 A1* | 6/2022 | Li | H04W 74/0808 |

FOREIGN PATENT DOCUMENTS

| | | | |
|---|---|---|---|
| CN | 107770877 A | 3/2018 | |
| CN | 108781471 A | 11/2018 | |
| CN | 108886818 A | 11/2018 | |
| CN | 109309961 A | 2/2019 | |
| CN | 109729589 A | 5/2019 | |
| EP | 3429303 A1 | 1/2019 | |
| WO | 2017160343 A1 | 9/2017 | |
| WO | WO-2018033106 A1 * | 2/2018 | ............ H04W 74/08 |
| WO | 2018171927 A1 | 9/2018 | |
| WO | 2019019982 A1 | 1/2019 | |
| WO | 2019139876 A1 | 7/2019 | |

OTHER PUBLICATIONS

Examination Report for Indian application No. 202117024945, dated Mar. 3, 2022. 7 pages with English translation.
First Office Action of the Chinese application No. 202110460707.0, dated May 7, 2022. 20 pages with English translation.
MediaTek Inc. "On Channel Access Procedure"3GPP TSG RAN WG1 #96bis R1-1904482, Apr. 8-12, 2019. 13 pages.
Samsung "LBT types for NR-U" 3GPP TSG-RAN WG2 Meeting #104 R2-1817094,Nov. 12-16, 2018. 2 pages.
Written Opinion of the International Search Authority in the international application No. PCT/CN2019/098755, dated Apr. 13, 2020. 9 pages with English translation.
Supplementary European Search Report in the European application No. 19939114.5, dated Dec. 14, 2021. 9 pages.
First Office Action of the European application No. 19939114.5, dated Sep. 9, 2022.
Second Office Action of the Chinese application No. 202110460707.0, dated Nov. 25, 2022.

* cited by examiner

METHOD FOR TRANSMITTING INFORMATION BASED ON CHANNEL ACCESS MANNERS, AND USER EQUIPMENT

CROSS-REFERENCE TO RELATED APPLICATION

This application is a U.S. continuation application of International Application No. PCT/CN2019/098755, entitled "INFORMATION TRANSMISSION METHOD, ELECTRONIC APPARATUS, AND STORAGE MEDIUM", filed on Jul. 31, 2019, the disclosure of which is hereby incorporated by reference in its entirety.

BACKGROUND

In a New Radio (NR) system on an unlicensed spectrum, under the condition that User Equipment (UE) determines that an Uplink (UL) burst is in Channel Occupancy Time (COT) of a network device, the UE is required to determine a channel access manner required to be used when a channel on the unlicensed spectrum is detected before UL transmission in the COT of the network device.

SUMMARY

For solving the foregoing technical problem, embodiments of the disclosure provide a method for transmitting information and UE. When UE determines that a UL burst or a sidelink burst is in COT of a network device, the UE may determine a channel access manner corresponding to the UL burst or the sidelink burst according to indication information from the network device.

According to a first aspect, the embodiments of the disclosure provide a method for transmitting information, which includes the following operations. UE receives first indication information from a network device, the first indication information being used to determine at least one channel access manner in COT of the network device.

The UE determines a first channel access manner for a target burst in the COT according to the first indication information. The target burst is used to transmit a target signal or a target channel.

According to a second aspect, the embodiments of the disclosure provide a UE, which includes a processor, a memory for storing a computer program executable by the processor and a network interface.

The processor is configured to run the computer program to control the network interface to receive first indication information from a network device, the first indication information being used to determine at least one channel access manner in COT of the network device.

The processor is configured to run the computer program to determine a first channel access manner for a target burst in the COT according to the first indication information. The target burst is used to transmit a target signal or a target channel.

DETAILED DESCRIPTION

For making the characteristics and technical contents in the embodiments of the disclosure understood in more detail, implementation of the embodiments of the disclosure will be described below in combination with the drawings in detail. The drawings are only adopted for description as references and not intended to limit the embodiments of the disclosure.

Before a method for transmitting information provided in the embodiments of the disclosure is described in detail, a UL burst is briefly described at first.

An unlicensed spectrum is a spectrum divided by countries and regions and available for radio device communication. The spectrum is usually considered as a shared spectrum, namely communication devices in different communication systems may use the spectrum as long as they meet the regulatory requirements set by the country or region on the spectrum, and does not need to apply for a proprietary spectrum authorization from the government.

In order to allow various communication systems that use unlicensed spectrum for wireless communication to coexist friendly in the spectrum, some countries or regions specify regulatory requirements that must be met to use the unlicensed spectrum. For example, an electronic device (or a communication device) follows the principle of "Listen Before Talk (LBT)", that is, the device needs to perform channel sensing before transmitting a signal on a channel of the unlicensed spectrum, or perform Clear Channel Assessment (CCA) at first. The electronic device may perform signal transmission only when a channel sensing result shows that the channel is idle, and if the channel sensing result of the electronic device for the channel of the unlicensed spectrum shows that the channel is busy, the electronic device cannot perform signal transmission. In order to ensure fairness, during a transmission, the duration for signal transmission by the electronic device using the channel of the unlicensed spectrum cannot exceed Maximum Channel Occupation Time (MCOT).

Signal transmission on an unlicensed spectrum involves the following concepts.

MCOT: it refers to a maximum time length allowed for signal transmission implemented by use of a channel of the unlicensed spectrum after successful LBT, and there is different MCOT under different Channel Access Priority Classes (CAPCs). A maximum value of present MCOT is 10 ms. It is to be understood that the MCOT is the duration for signal transmission.

COT: it refers to a time length for signal transmission implemented by use of the channel of the unlicensed spectrum after successful LBT, and the channel may be discontinuously occupied by signals in the time length. A piece of COT may not exceed 20 ms, and moreover, a duration for signal transmission in the COT does not exceed the MCOT.

COT of a network device (i.e., a base station) (gNB-initiated COT): it is also called COT initiated by the network device and refers to a piece of COT obtained by the network device after successful LBT. In the COT of the network device, Downlink (DL) transmission may be implemented, and UE may also perform UL transmission when a certain condition is met.

COT of the UE (UE-initiated COT): it is also called COT initiated by the UE and refers to a piece of COT obtained by the UE after successful LBT.

DL burst: it is a group of DL transmissions (namely including one or more DL transmissions) implemented by the network device. The group of DL transmissions are continuous transmissions (namely there are no gaps between the multiple DL transmissions), or there are gaps in the group of DL transmissions but the gaps are less than or equal to 16 μs. If a gap between two DL transmissions implemented by the network device is larger than 16 μs, it is considered that the two DL transmissions belong to two DL bursts.

UL burst: it is a group of UL transmissions (namely including one or more UL transmissions) implemented by the UE. The group of UL transmissions are continuous transmissions (namely there are no gaps between the multiple UL transmissions), or there are gaps in the group of UL transmissions but the gaps are less than or equal to 16 μs. If a gap between two UL transmissions implemented by the UE is larger than 16 μs, it is considered that the two UL transmissions belong to two UL bursts.

Figure 1:
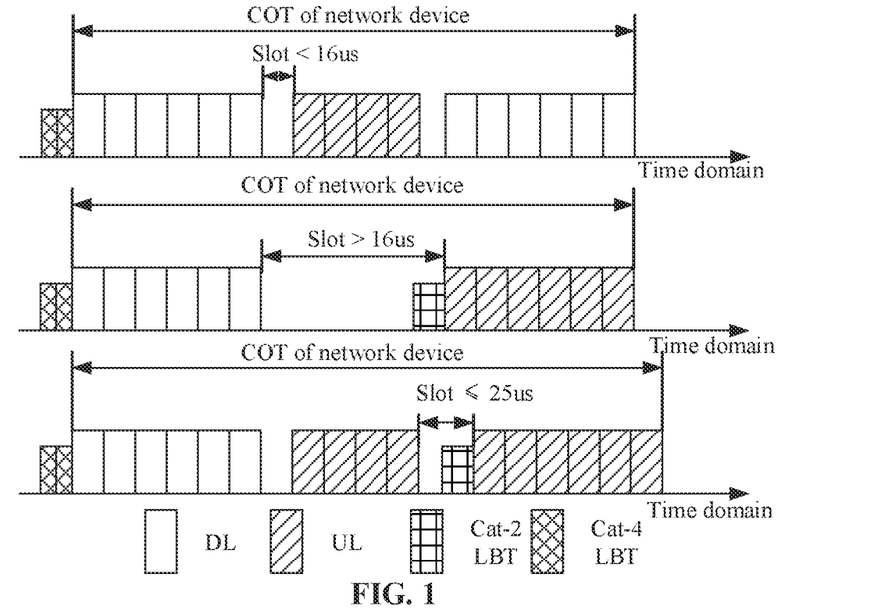
FIG. 1 is a schematic diagram of COT according to the disclosure.

A schematic diagram of the COT of the network device is shown in FIG. 1. After the network device obtains the COT, resources in the COT may be configured for UL transmission by the UE. For a UL burst in the COT of the network device, if a gap between a starting position of the UL burst and an ending position of a DL burst is smaller than 16 μs, the UE may perform UL transmission (also called Category (Cat)-1 LBT) immediately. If there is no DL burst after the UL burst in the COT of the network device, the UE may perform Cat-2 LBT before transmission. If a gap between any two adjacent transmissions in the COT of the network device is less than or equal to 25 μs, the UE may perform Cat-2 LBT.

Cat-1 LBT may refer to that the network device performs transmission without channel detection after a gap ends. Cat-2 LBT refers to that the network device performs single-slot channel detection. Specifically, Cat-2 LBT may include 25 μs single-slot channel detection and 16 μs single-slot channel detection. For a UL burst in the COT of the network device, if a gap between a starting position of the UL burst and an ending position of a last DL burst is 16 μs, the UE may perform 16 μs Cat-2 LBT before the UL burst. If the gap between the starting position of the UL burst and the ending position of the last DL burst is 25 μs, the UE may perform 25 μs Cat-2 LBT before the UL burst. The network device may ensure a size of the gap between the starting position of the UL burst and the ending position of the last DL burst and notify the size of the gap or a corresponding LBT manner to the UE.

It is to be understood that a manner for the network device to obtain the COT may be a Load Based Equipment (LBE)-based channel access manner, namely the network device may perform LBT on the unlicensed spectrum after a service arrives and start sending a signal after successful LBT. The manner may also be a Frame Based Equipment (FBE)-based channel access manner, namely the network device periodically performs LBT on the unlicensed spectrum.

If the LBE-based channel access manner is adopted, the network device may obtain the COT by Cat-4 LBT. Cat-4 LBT may refer to that a channel detection manner of a communication device is a multi-slot channel detection based on random back-off with a contention window of variable size. Specifically, Cat-4 LBT may include different CAPCs according to priorities of transmitted services.

Figure 2:
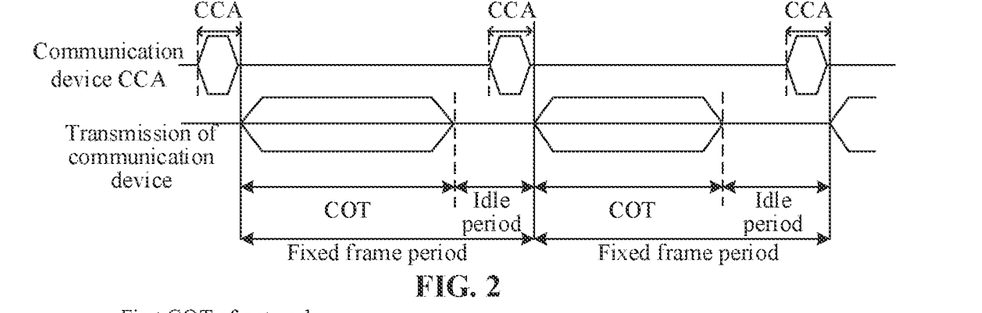
FIG. 2 is another schematic diagram of COT according to the disclosure.

If the FBE-based channel access manner is adopted, the schematic diagram of the COT is shown in FIG. 2. In this manner, frame structures appear periodically. A frame structure includes a fixed frame period (a length does not exceed 200 ms), COT (a length does not exceed 95% of the fixed frame period) and idle time (a length is at least 5% of the COT, minimally 100 us, and it is at the end of the fixed frame period). The network device performs LBT on the unlicensed spectrum (or performs CCA detection on the unlicensed spectrum, for example, single-slot channel detection or multi-slot channel detection) in the idle time. If LBT succeeds, COT in a next fixed frame period may be used for signal transmission. If LBT fails, the COT in the next fixed frame period can not be used for signal transmission. That is, channel resources available for service sending of the electronic device appear periodically.

Indication of a channel access type will be briefly described below.

When the UE is scheduled to transmit a Physical Uplink Shared Channel (PUSCH), the network device may indicate a channel access type and CAPC corresponding to the PUSCH through Downlink Control Information (DCI) containing a UL grant.

Specifically, the channel access type occupies 1 bit, configured to indicate a channel access type 1 or a channel access type 2. The channel access type 1 may include Cat-4 LBT, and the channel access type 2 may include 25 μs Cat-2 LBT. A principle that the network device indicates the channel access type is as follows. If the PUSCH to be transmitted is in the COT of the network device, Cat-2 LBT is indicated, otherwise Cat-4 LBT is indicated.

The CAPC occupies 2 bits. When the channel access type is the channel access type 1, the 2 bits are used to determine a corresponding channel access parameter from Table 1. Table 1 shows channel access parameters corresponding to different CAPCs under Cat-4 LBT. If a value of p is smaller, the CAPC is higher.

TABLE 1

| CAPC (p) | $m_p$ | $CW_{min,p}$ | $CW_{max,p}$ | $T_{mcot,p}$ | Allowed $CW_p$ value |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

$m_p$ refers to a number of back-off slots corresponding to the CAPC p,
$CW_p$ refers to a contention window size corresponding to the CAPC p,
$CW_{min,p}$ refers to a minimum value of $CW_p$ corresponding to the CAPC p,
$CW_{max,p}$ refers to a maximum value of $CW_p$ corresponding to the CAPC p, and
Tmcot,p refers to a duration of MCOT corresponding to the CAPC p.

$m_p$ refers to a number of back-off slots corresponding to the CAPC p, $CW_p$ refers to a contention window size corresponding to the CAPC p. $CW_{min,p}$ refers to a minimum value of $CW_p$ corresponding to the CAPC p, $CW_{max,p}$ refers to a maximum value of $CW_p$ corresponding to the CAPC p, and $T_{mcot,p}$ refers to a duration of MCOT corresponding to the CAPC p.

Figure 3:
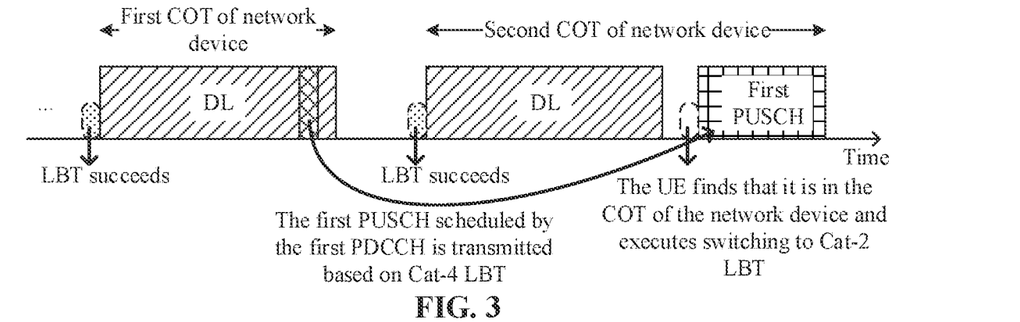
FIG. 3 is a schematic diagram of switching a Listen Before Talk (LBT) manner for a UL burst according to the disclosure.

It is to be noted that, in the COT of the network device, only one switching point between DL transmission and UL transmission may be allowed. The switching point between the DL transmission and the UL transmission refers to a moment when a DL transmission is switched to a UL transmission in the COT of the network device. In the COT of the network device, as shown in FIG. 3, for example, a channel access type corresponding to a first PUSCH to be transmitted by the UE is indicated to be the channel access type 1, for example, Cat-4 LBT, and the first PUSCH is scheduled by a first Physical Downlink Control Channel (PDCCH) in first COT of the network device. If the UE receives common control information from the network device, determines resources shared to the UL transmission in second COT of the network device according to the common control information, and determines that the first PUSCH to be transmitted is in the COT shared by the network device, then the UE may switch Cat-4 LBT corresponding to the first PUSCH to Cat-2 LBT.

Along with the evolution of communication systems, the channel access type required to be indicated may include Cat-1 LBT, Cat-2 LBT and Cat-4 LBT. Cat-2 LBT includes 25 µs Cat-2 LBT and 16 µs Cat-2 LBT. In addition, there may be more than one switching point between DL transmission and UL transmission in the COT of the network device. Under the condition that the channel access type corresponding to the first PUSCH to be transmitted by the UE is indicated to be the channel access type 1, for example, Cat-4 LBT, the first PUSCH being scheduled by the first PDCCH in the first COT of the network device or the first PUSCH being a PUSCH under a configured grant, if the UE receives the common control information from the network device, determines that the second COT of the network device includes the resources shared to the UL transmission according to the common control information, and determines that the first PUSCH to be transmitted is in the COT shared by the network device, then the UE may switch Cat-4 LBT corresponding to the first PUSCH to another channel access type.

It is to be noted that the switching mentioned here may refer to that the channel access manner determined by the UE is changed and does not represent that the UE is required to execute a switching operation.

Figure 4:
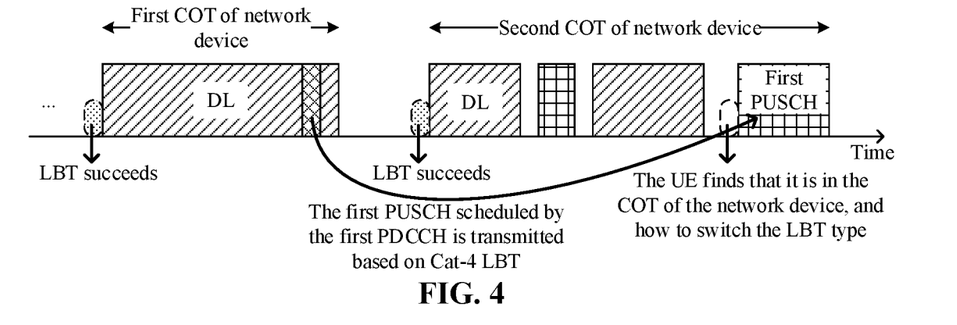
FIG. 4 is another schematic diagram of switching an LBT manner for a UL burst according to the disclosure.

In this scenario, as shown in FIG. 4, when the UE determines that a UL burst is in the COT of the network device, the UE may determine that the channel access manner may be switched from Cat-4 LBT to one of 25 µs Cat-2 LBT, 16 µs Cat-2 LBT or Cat-1 LBT or switched from Cat-4 LBT with a low priority to Cat-4 LBT with a higher priority, for example, switched from p=2 to p=1.

The UE is also required to further determine a specific LBT type required to be used in 25 µs Cat-2 LBT, 16 µs Cat-2 LBT or Cat-1 LBT and/or a specific gap corresponding to the LBT type in the COT of the network device.

The technical solutions in the embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, an Advanced LTE (LTE-A) system, an NR system, an evolved system of the NR system, an LTE-based access to unlicensed spectrum (LTE-U) system, an NR-based access to unlicensed spectrum (NR-U) system, a Universal Mobile Telecommunication System (UMTS), a Worldwide Interoperability for Microwave Access (WiMAX) communication system, a Wireless Local Area Network (WLAN), Wireless Fidelity (WiFi), a next-generation communication system or another communication system.

Generally speaking, connections supported by a conventional communication system are usually limited in number and also easy to implement. However, along with the development of communication technologies, a mobile communication system will not only support conventional communication but also support, for example, Device to Device (D2D) communication, Machine to Machine (M2M) communication, Machine Type Communication (MTC) and Vehicle to Vehicle (V2V) communication. The embodiments of the disclosure may also be applied to these communication systems.

A system architecture and service scenario described in the embodiments of the disclosure are for describing the technical solutions in the embodiments of the disclosure more clearly and not intended to limit the technical solutions provided in the embodiments of the disclosure. Those of ordinary skill in the art should know that, along with the evolution of network architectures and emergence of new service scenarios, the technical solutions provided in the embodiments of the disclosure are also applied to similar technical problems.

The network device involved in the embodiments of the disclosure may be an ordinary base station (for example, a NodeB (NB) or an Evolutional Node B (eNB or eNodeB) or a gNB), an NR controller, a centralized unit, an NR base station, a radio remote module, a micro base station, a relay, a distributed unit, a Transmission Reception Point (TRP), a Transmission Point (TP) or any other device. A specific technology and specific device form for the network device are not limited in the embodiments of the disclosure. For convenient description, in all the embodiments of the disclosure, any device providing a wireless communication function for the UE is collectively referred to as a network device.

In the embodiments of the disclosure, a terminal device may be any terminal. For example, the terminal device may be MTC UE. That is, the terminal device may also be called UE, a Mobile Station (MS), a mobile terminal, a terminal and the like. The terminal device may communicate with one or more core networks through a Radio Access Network (RAN). For example, the terminal device may be a mobile phone (or called a "cell" phone) or a computer with a mobile terminal. For example, the terminal device may also be a portable, pocket, handheld, computer-embedded or vehicle-mounted mobile device and performs voice and/or data exchange with the RAN. No specific limits are made in the embodiments of the disclosure.

Optionally, the network device and the terminal device may be deployed on the land indoors or outdoors in a handheld or vehicle-mounted form, may also be deployed on the water, and may further be deployed on an airplane, balloon and satellite in the air. An application scenario of the network device and the terminal device is not limited in the embodiments of the disclosure.

Optionally, a communication between a network device and a terminal device and a communication between terminal devices may be implemented through a licensed spectrum, the communication may also be implemented through an unlicensed spectrum, and the communication may also be implemented through both the licensed spectrum and the unlicensed spectrum. The communication between the network device and the terminal device and the communication between the terminal devices may be implemented through a spectrum below 7 Gigahertz (GHz), the communication may also be implemented through a spectrum above 7 GHz, and the communication may also be implemented through both the spectrum below 7 GHz and the spectrum above 7 GHz. A spectrum resource used between the network device and the terminal device is not limited in the embodiments of the disclosure.

Generally speaking, connections supported by a conventional communication system are usually limited in number and also easy to implement. However, along with the development of communication technologies, a mobile communication system will not only support conventional communication but also support, for example, D2D communication, M2M communication, MTC and V2V communication. The embodiments of the disclosure may also be applied to these communication systems.

Figure 5:
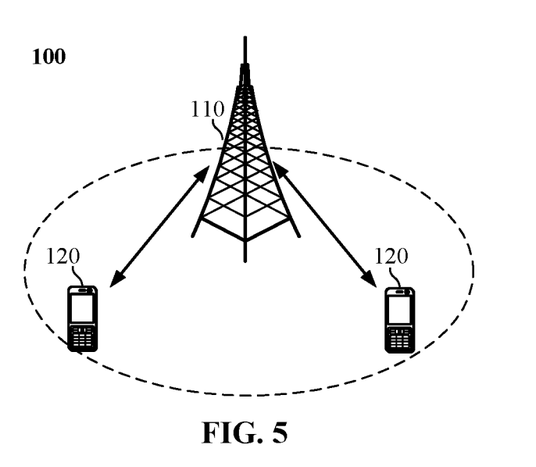
FIG. 5 is a composition structure diagram of a communication system according to an embodiment of the disclosure.

Exemplarily, a communication system 100 that the embodiments of the disclosure are applied to is shown in FIG. 5. The communication system 100 may include a network device 110, and the network device 110 may be a device communicating with a terminal device 120 (or called a communication terminal or a terminal). The network device 110 may provide a communication coverage for a specific geographical region and may communicate with a terminal device located in the coverage. Optionally, the network device 110 may be a Base Transceiver Station (BTS) in the GSM or the CDMA system, may also be an NB in the WCDMA system, and may further be an eNB in the LTE system or a wireless controller in a Cloud Radio Access Network (CRAN). The network device may be a mobile switching center, a relay station, an access point, a vehicle device, a wearable device, a hub, a switch, a network bridge, a router, a network-side device in a future 5th-Generation (5G) network, a network device in a future evolved Public Land Mobile Network (PLMN) or the like.

The communication system 100 further includes at least one terminal device 120 within the coverage of the network device 110. The "terminal device" used herein includes, but not limited to, a device arranged to receive/send a communication signal through a wired line connection, for example, through Public Switched Telephone Network (PSTN), Digital Subscriber Line (DSL), digital cable and direct cable connections, and/or another data connection/network, and/or through a wireless interface, for example, through a cellular network, a WLAN, a digital television network like a Digital Video Broadcasting-Handheld (DVB-H) network, a satellite network and an Amplitude Modulated (AM)-Frequency Modulated (FM) broadcast transmitter, and/or through another communication terminal, and/or an Internet of Things (IoT) device. The terminal device configured to communicate through a wireless interface may be called a "wireless communication terminal", a "wireless terminal" or a "mobile terminal". Examples of the mobile terminal include, but not limited to, a satellite or cellular telephone, a Personal Communication System (PCS) terminal capable of combining a cellular radio telephone and data processing, faxing and data communication capabilities, a Personal Digital Assistant (PDA) capable of including a radio telephone, a pager, Internet/intranet access, a Web browser, a notepad, a calendar and/or a Global Positioning System (GPS) receiver, and a conventional laptop and/or palmtop receiver or another electronic device including a radio telephone transceiver. The terminal device may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a PDA, a handheld device with a wireless communication function, a computing device, another processing device connected to a wireless modem, a vehicle device, a wearable device, a terminal device in the 5G network, a terminal device in the future evolved PLMN or the like.

Optionally, the terminal device 120 may perform D2D communication with another terminal device. In the disclosure, a signal or channel transmitted by the D2D communication may be called a sidelink signal or a sidelink channel, and a burst for transmitting the sidelink signal or the sidelink channel may be called a sidelink burst.

Optionally, the 5G system or the 5G network may also be called an NR system or an NR network.

A network device and two terminal devices are exemplarily shown in FIG. 5. Optionally, the communication system 100 may include multiple network devices and another number of terminal devices may be included in coverage of each network device. No limits are made thereto in the embodiments of the disclosure.

Optionally, the communication system 100 may further include other network entities such as a network controller and a mobility management entity. No limits are made thereto in the embodiments of the disclosure.

It is to be understood that a device with a communication function in the network/system in the embodiments of the disclosure may be called a communication device. For example, for the communication system 100 shown in FIG. 5, communication devices may include the network device 110 and terminal device 120 with the communication function, and the network device 110 and the terminal device 120 may be the specific devices mentioned above and will not be elaborated herein. The communication devices may further include other devices in the communication system 100, for example, other network entities like a network controller and a mobility management entity. No limits are made thereto in the embodiments of the disclosure.

The system architecture and service scenario described in the embodiments of the disclosure are for describing the technical solutions in the embodiments of the disclosure more clearly and not intended to limit the technical solutions provided in the embodiments of the disclosure. Those of ordinary skill in the art should know that, along with the evolution of network architectures and emergence of new service scenarios, the technical solutions provided in the embodiments of the disclosure are also applied to similar technical problems.

Figure 6:
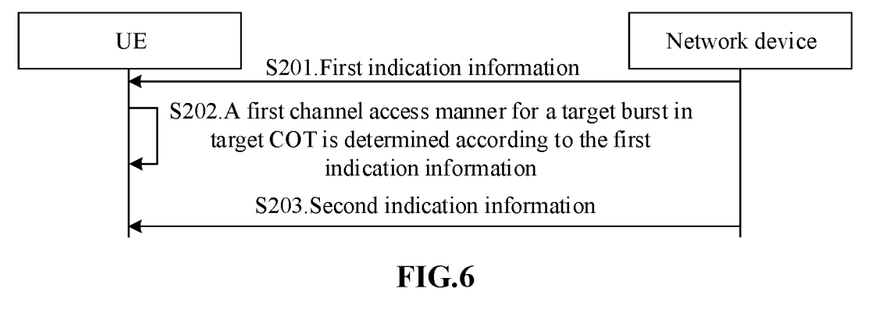
FIG. 6 is an optional processing flowchart of a method for transmitting information according to an embodiment of the disclosure.

As shown in FIG. 6, an optional processing flow of a method for transmitting information provided in the embodiments of the disclosure includes at least part of the following contents.

At block S201, UE receives first indication information from a network device.

In some embodiments, the first indication information is used to determine at least one channel access manner in COT of the network device. For example, the first indication information indicates the at least one channel access manner in the COT of the network device. Specifically, the first indication information may explicitly and directly indicate the at least one channel access manner in the COT of the network device. For example, the at least one channel access manner in the COT of the network device may be indicated through a set corresponding to the first indication information. For example, the first indication information is {00, 01, 10}, where "00" represents Cat-1, "01" represents 16 μs Cat-2, and "10" represents 25 μs Cat-2. The first indication information may also implicitly indicate the at least one channel access manner in the COT of the network device. For example, the first indication information indicates a size of a gap, and a channel access manner required to be used for channel detection is determined according to the size of the gap.

Optionally, the first indication information may be physical-layer signaling. For example, the first indication information is information in DCI, and the DCI may be common control information or UE-dedicated DCI.

Optionally, the first indication information may be high-layer signaling. For example, the first indication information is Media Access Control (MAC) Control Element (CE) signaling.

In some other embodiments, besides being used to determine the at least one channel access manner in the COT of the network device, the first indication information is further used to determine at least one channel access manner outside the COT. For example, the first indication information indicates the at least one channel access manner in the COT of the network device and indicates the at least one channel access manner outside the COT.

Herein, the COT may be a piece of COT of the network device. The COT may be COT obtained by the network device according to FBE, and may also be COT obtained by the network device according to LBE or COT obtained by the network device through another manner. No limits are made thereto in the disclosure.

In the embodiments of the disclosure, the channel access manner includes at least one of a first channel access type, a second channel access type or a third channel access type.

Specifically, the first channel access type includes a multi-slot channel detection based on random back-off with a contention window of variable size, for example, Cat-4 LBT. The first channel access type includes different CAPCs, and each CAPC may be considered as a channel access manner.

The second channel access type includes single-slot channel detection, for example, Cat-2 LBT. The second channel access type includes single-slot channel detection based on different detection intervals. Specifically, Cat-2 LBT includes Cat-2 LBT based on a first detection interval such as a detection interval of 25 μs and Cat-2 LBT based on a second detection interval such as a detection interval of 16 μs. Cat-2 LBT based on each detection interval may be considered as a channel access manner. For convenient description, in the disclosure, Cat-2 LBT based on the detection interval of 25 μs may be called a first channel access manner of the second channel access type, and Cat-2 LBT based on the detection interval of 16 μs may be called a second channel access manner of the second channel access type.

The third channel access type includes implementing transmission without channel detection after a gap ends, for example, Cat-1 LBT.

In some embodiments of the disclosure, the channel access manner includes at least one of the first channel access manner of the second channel access type, the second channel access manner of the second channel access type or the third channel access type.

As an example rather than a limit, the first indication information is used to determine the at least one channel access manner in the COT of the network device, and the at least one channel access manner includes at least one of the first channel access manner of the second channel access type, the second channel access manner of the second channel access type or the third channel access type.

In some other embodiments of the disclosure, besides at least one of the first channel access manner of the second channel access type, the second channel access manner of the second channel access type or the third channel access type, the channel access manner further includes at least one of a first CAPC of the first channel access type, a second CAPC of the first channel access type, a third CAPC of the first channel access type or a fourth CAPC of the first channel access type. Each of the first CAPC of the first channel access type, the second CAPC of the first channel access type, the third CAPC of the first channel access type and the fourth CAPC of the first channel access type corresponds to a respective CAPC, as shown in Table 1. It is to be understood that Table 1 is an example and parameters in Table 1 may be modified. No limits are made thereto in the disclosure.

As an example rather than a limit, besides being used to determine the at least one channel access manner in the COT of the network device, the first indication information is further used to determine the at least one channel access manner outside the COT. Besides at least one of the first channel access manner of the second channel access type, the second channel access manner of the second channel access type or the third channel access type, the at least one channel access manner further includes at least one of the first CAPC of the first channel access type, the second CAPC of the first channel access type, the third CAPC of the first channel access type or the fourth CAPC of the first channel access type.

Optionally, the first indication information is used to determine a target channel access manner group, the target channel access manner group is used to determine the at least one channel access manner in the COT. For example, if the first indication information is "001", it is determined that the target access manner group is {Cat-1, 16 μs Cat-2, 25 μs Cat-2}.

Optionally, the target channel access manner group is determined according to a first parameter, the first parameter is configured by a high layer or is preset. The first parameter includes at least one of at least one channel access manner in the target channel access manner group, the number of the channel access manners in the target channel access manner group or a maximum number of the channel access manners in the target channel access manner group.

Optionally, the target channel access manner group is configured by the high layer or is preset, and the first indication information is used to determine the at least one channel access manner from the target channel access manner group. For example, the target channel access manner group is configured by the high layer to be {Cat-1, 16 μs Cat-2, 25 μs Cat-2} corresponding to {00, 01, 10}, respectively. When the first indication information is 0010, the at least one channel access manner is Cat-1 and 25 μs Cat-2.

Optionally, the at least one channel access manner in the target channel access manner group is applied to at least one burst in target COT of the network device.

Optionally, the target channel access manner group forms a correspondence with at least one burst in the COT. For example, an ith channel access manner in the target channel access manner group corresponds to an ith UL burst in the at least one burst in the COT, the number of UL bursts in the COT being less than or equal to the number of the channel access manners in the target channel access manner group. For another example, the ith channel access manner in the target channel access manner group corresponds to an (i+1)th burst in the at least one burst in the COT. This is mainly because the COT is determined after successful LBT of the network device and a channel access manner for a first burst in the COT is not required to be indicated.

Optionally, the target channel access manner group may not include a channel access manner for a burst (DL burst) of the network device. This is because the target channel access manner group is configured for the network device to indicate a channel access manner corresponding to transmission of the UE and a channel access manner of the network device may be determined by itself. The channel access manner corresponding to transmission of the network device in the COT may be the first channel access manner of the second channel access type or the second channel access manner of the second channel access type. Optionally, the channel access manner corresponding to the transmission of the network device in the COT may not be the third channel access type, namely the network device is required to perform LBT before each transmission in the COT is started.

Figure 7:
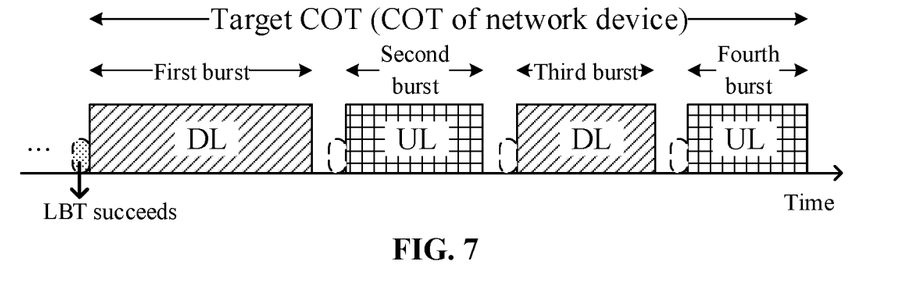
FIG. 7 is a schematic diagram of bursts in COT of a network device according to an embodiment of the disclosure.

Optionally, the target channel access manner group may include a channel access manner corresponding to at least one UL burst in the COT. For example, FIG. 7 is a schematic diagram of bursts in the COT of the network device. A piece of COT of the network device includes four bursts, a first burst and a third burst are DL bursts, and a second burst and a fourth burst are UL bursts. The target channel access manner group includes a channel access manner corresponding to the second burst, or, the first indication information includes an indication of the channel access manner corresponding to the second burst.

Optionally, the target channel access manner group may include channel access manners corresponding to all UL bursts in the COT. For example, still as shown in FIG. 7, the target channel access manner group includes the channel access manners corresponding to the second burst and the fourth burst, or, the first indication information includes an indication of the channel access manners corresponding to the second burst and the fourth burst.

Figure 8:
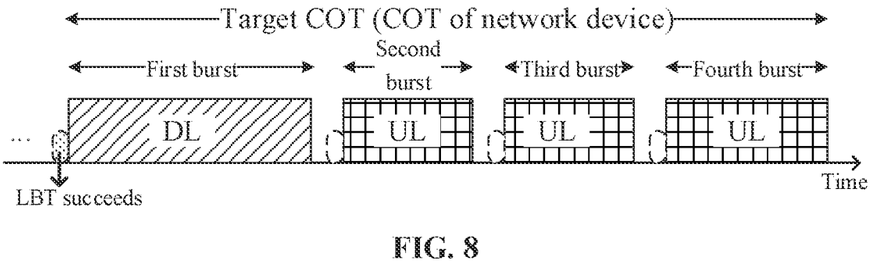
FIG. 8 is another schematic diagram of bursts in COT of a network device according to an embodiment of the disclosure.

For example, FIG. 8 is another schematic diagram of bursts in the COT of the network device. The COT of the network device includes four bursts, a first burst is a DL burst, and a second burst, a third burst and a fourth burst are UL bursts. The target channel access manner group includes channel access manners corresponding to the second burst, the third burst and the fourth burst, or, the first indication information includes an indication of the channel access manners corresponding to the second burst, the third burst and the fourth burst.

Optionally, the target channel access manner group may include the channel access manner corresponding to at least one burst, except a first transmission, in the COT. For example, still as shown in FIG. 7, the target channel access manner group includes a channel access manner corresponding to the third burst, or, the first indication information includes an indication of the channel access manner corresponding to the third burst.

Optionally, the target channel access manner group may include the channel access manners corresponding to all the bursts, except the first transmission, in the COT. For example, still as shown in FIG. 7, the target channel access manner group includes the channel access manners corresponding to the second burst, the third burst and the fourth burst respectively, or, the first indication information includes an indication of the channel access manners corresponding to the second burst, the third burst and the fourth burst.

Optionally, the target channel access manner group may include a channel access manner corresponding to at least one sidelink burst in the COT.

Optionally, the target channel access manner group may include channel access manners corresponding to all sidelink bursts in the COT.

In some embodiments of the disclosure, the target channel access manner group is a channel access manner group in a set of channel access manner groups, the set of channel access manner groups including at least one channel access manner group.

Optionally, the set of channel access manner groups is determined according to a second parameter. The second parameter is configured by the high layer or preset, and the second parameter includes at least one of the at least one channel access manner group in the set of channel access manner groups, the number of the channel access manner groups in the set of channel access manner groups or the maximum number of the channel access manner groups in the set of channel access manner groups.

Optionally, under the condition that the set of channel access manner groups includes at least two channel access manner groups, each channel access manner group in the at least two channel access manner groups may include the same number of channel access manners. For example, the number of the channel access manners in each channel access manner group is N, N being an integer. A value of N is configured by the high layer or preset. Optionally, the value of N is 2 or 3.

As an example, the value of N is, for example, 2, and the set of channel access manner groups is shown in Table 2. The set of channel access manner groups includes seven channel access manner groups, and each channel access manner group includes two channel access manners. For example, if an index of the channel access manner group indicated by the first indication information is 5, the UE, after receiving the first indication information, may determine that the two channel access manners in the target channel access manner group are the second channel access manner of the second channel access type and the first channel access manner of the second channel access type.

TABLE 2

| Channel access manner group | 0th channel access manner | First channel access manner |
|---|---|---|
| 0 | Third channel access type | First channel access manner of the second channel access type |
| 1 | Third channel access type | Second channel access manner of the second channel access type |
| 2 | Third channel access type | Third channel access type |
| 3 | First channel access manner of the second channel access type | First channel access manner of the second channel access type |
| 4 | First channel access manner of the second channel access type | Second channel access manner of the second channel access type |
| 5 | Second channel access manner of the second channel access type | First channel access manner of the second channel access type |
| 6 | Second channel access manner of the second channel access type | Second channel access manner of the second channel access type |

Optionally, under the condition that the set of channel access manner groups includes at least two channel access manner groups, each channel access manner group in the at least two channel access manner groups may include a respective number of channel access manners.

As an example, the value of N is, for example, 3, and the set of channel access manner groups is shown in Table 3. The set of channel access manner groups includes eight channel access manner groups, and at least two channel access manner groups in the eight channel access manner groups include different numbers of channel access manners. For example, if the index of the channel access manner group indicated by the first indication information is 6, the UE, after receiving the first indication information, may determine that the target channel access manner group includes three channel access manners and the three channel access manners are the third channel access type, the second channel access manner of the second channel access type and the first channel access manner of the second channel access type.

TABLE 3

| Channel access manner group | 0th channel access manner | First channel access manner | Second channel access manner |
|---|---|---|---|
| 0 | Third channel access type | — | — |
| 1 | First channel access manner of the second channel access type | — | — |
| 2 | Second channel access manner of the second channel access type | — | — |
| 3 | Third channel access type | First channel access manner of the second channel access type | — |
| 4 | Second channel access manner of the second channel access type | First channel access manner of the second channel access type | — |
| 5 | First channel access manner of the second channel access type | First channel access manner of the second channel access type | — |
| 6 | Third channel access type | Second channel access manner of the second channel access type | First channel access manner of the second channel access type |
| 7 | First channel access manner of the second channel access type | First channel access manner of the second channel access type | First channel access manner of the second channel access type |

In the embodiments of the disclosure, the at least one channel access manner includes the channel access manner for at least one burst in the COT, and the at least one burst includes at least one of:

at least one UL burst in the COT, all UL bursts in the COT, at least one sidelink burst in the COT, all sidelink bursts in the COT, at least one burst, except the first burst, in the COT or all remaining bursts, except the first burst, in the COT.

In some embodiments, the UL burst may include a UL burst of the UE and/or a UL burst of other UE except the UE.

In some embodiments, the sidelink burst may include a sidelink burst of the UE and/or a sidelink burst of other UE except the UE.

At block S202, the UE determines a first channel access manner for a target burst in the COT according to the first indication information.

In some embodiments, a channel access manner for a burst may refer to a channel access manner corresponding to the burst, or channel detection is performed in the channel access manner before the burst starts. For example, the first channel access manner for the target burst may refer to a channel access manner used by the UE to perform channel detection before the target burst starts and, under the condition that channel detection succeeds, it is determined that a resource in the target burst is available for the UE. The target burst is used to transmit a target signal or a target channel. The UE may transmit the target signal or the target channel through the resource in the target burst. The target signal or the target channel includes at least one of a UL signal, a UL channel, a sidelink signal or a sidelink channel. When the target signal or the target channel is the sidelink signal or the sidelink channel, the UE may be UE in a D2D or Vehicle to Everything (V2X) system, etc.

In some embodiments, the target burst is an ith burst in the at least one burst, and the first channel access manner is an ith channel access manner in the at least one channel access manner, i being a positive integer. For example, the UE determines according to the first indication information that the at least one channel access manner includes sequentially a channel access manner A, a channel access manner B and a channel access manner C. If the target burst is a second UL burst in the COT, the UE determines to perform channel detection according to the channel access manner B before the second UL burst starts.

At block S203, the UE receives second indication information from the network device. The second indication information is used to determine at least one burst in the COT.

In some embodiments, the at least one burst includes the target burst, namely the at least one burst includes a burst for the UE to transmit a UL channel or a UL signal in the COT.

In some embodiments, the maximum number of the UL bursts in the COT or the number of the UL bursts in the COT is configured by the high layer or preset.

In some other embodiments, the at least one burst does not include a burst where the network device transmits a DL channel or a DL signal in the COT.

Optionally, the second indication information may be physical-layer signaling. For example, the second indication information is information in DCI, and the DCI may be common control information or UE-dedicated DCI.

Optionally, the second indication information may be high-layer signaling. For example, the second indication information is MAC CE signaling.

It is to be understood that the second indication information and the first indication information may be information in the same control information and may also be information in different control information, and no limits are made thereto in the disclosure. The control information may be physical-layer signaling such as DCI transmitted in a PDCCH, and may also be high-layer signaling such as MAC CE signaling. For example, the first indication information and the second indication information are in the same control information, and the control information is DCI in a Group Common-Physical Downlink Control Channel (GC-PDCCH).

In some embodiments, the second indication information is used to determine at least one of:

a starting symbol in the target burst and/or a starting position in the starting symbol;

an ending symbol in the target burst and/or an ending position in the ending symbol;

a position of the target burst in the COT;

a duration of the target burst;

a first length, the first length including a time distance between a symbol for transmitting the second indication information and the starting symbol in the target burst, or the first length including a time distance between a slot for transmitting the second indication information and the starting symbol in the target burst; or a second length, the second length including a time distance between an ending symbol in a burst for transmitting the second indication information and the starting symbol in the target burst, or the second length including a time distance between an ending slot in the burst for transmitting the second indication information and the starting symbol in the target burst.

In some embodiments, information indicated by the second indication information is determined according to a first subcarrier spacing, the first subcarrier spacing being less than or equal to a subcarrier spacing corresponding to the target burst. The subcarrier spacing corresponding to the target burst refers to a subcarrier spacing adopted for transmission of the UL channel or the UL signal in the target burst. Optionally, the first subcarrier spacing is configured by the high layer.

In some embodiments, the number of the bursts in the COT is indicated by a physical layer or configured by the high layer, and/or, the maximum number of the bursts in the COT is configured by the high layer or preset.

In the embodiments of the disclosure, indication by the physical layer may refer to indication by the network device through the DCI. Configuration by the high layer may refer to indication by the network device through the high-layer signaling. The high-layer signaling includes Radio Resource Control (RRC) signaling and/or a MAC CE.

In the embodiments of the disclosure, before S202 is executed, the method may further include the following operation.

At block S200, the UE receives third indication information from the network device before the COT. The third indication information is used to determine that a channel access manner for the target burst is a second channel access manner and the second channel access manner is different from the first channel access manner.

Optionally, the second channel access manner differs from the first channel access manner in that a priority of the first channel access manner is higher than a priority of the second channel access manner.

Optionally, the first channel access manner includes at least one of: the first channel access manner of the second channel access type, the second channel access manner of the second channel access type or the third channel access type. The second channel access type may be Type 1 channel access type. In other words, the first channel access manner includes one of: Cat-2 LBT based on the detection interval of 25 μs, Cat-2 LBT based on the detection interval of 16 μs and Cat-1 LBT, and the second channel access type may be Cat-4 LBT.

Optionally, the first channel access manner is Cat-4 LBT with a priority p1, and the second channel access manner is Cat-4 LBT with a priority p2, p1 being less than p2 or the priority of p1 being higher than the priority of p2.

In some embodiments, when the UE transmits the target signal or the target channel such as a PUSCH, the UE determines to perform channel detection in the second channel access manner such as Cat-4 LBT to determine whether the PUSCH can be transmitted or not. Furthermore, before the UE transmits the PUSCH, if the UE determines, according to information from the network device, that the PUSCH is in the target burst in the COT of the network device and determines that the channel access manner corresponding to the target burst is the first channel access manner, the UE may perform channel detection in the first channel access manner such as 16 μs Cat-2 LBT to determine whether the PUSCH can be transmitted or not. In other words, the UE switches a channel access manner for the PUSCH from Cat-4 LBT to 16 μs Cat-2 LBT.

In some embodiments, the UE determines the target channel access manner group according to the first indication information and determines the at least one burst in the COT according to the second indication information, the ith channel access manner in the target channel access manner group corresponding to the ith UL burst in the at least one burst. The UE determines that a target UL signal or a target UL channel is in a jth UL burst in the at least one burst, and thus the UE determines a jth channel access manner in the target channel access manner group as a channel access manner for the target UL signal or the target UL channel.

In some embodiments, after the UE determines the channel access manner for the target UL signal or the target UL channel, the UE performs LBT in the channel access manner before the target UL signal or the target UL channel is transmitted. If LBT succeeds, the UE may transmit the target UL signal or the target UL channel. If LBT fails, the UE cannot transmit the target UL signal or the target UL channel.

As an example, as shown in Table 4, the set of channel access manner groups includes seven channel access manner groups, and each channel access manner group includes three channel access manners and may be represented by three bits. Optionally, Cat-1 LBT refers to implementing transmission without channel detection after the gap ends, and Cat-2 LBT refers to implementing transmission after successful single-slot channel detection, so that Cat-1 LBT is not after Cat-2 LBT. This is mainly because it may be considered that a right to use a channel may not be lost (or, a burst for the channel may not be lost) for Cat-1 LBT and there is a certain possibility that the right to use the channel is lost (or, the burst for the channel is lost or the channel is occupied by another device) for Cat-2 LBT.

TABLE 4

| First indication information | 0th channel access manner | First channel access manner | Second channel access manner |
|---|---|---|---|
| 000 | Cat-1 | Cat-1 | 25 μs Cat-2 |
| 001 | Cat-1 | 16 μs Cat-2 | 25 μs Cat-2 |
| 010 | Cat-1 | 25 μs Cat-2 | 25 μs Cat-2 |
| 011 | 16 μs Cat-2 | 16 μs Cat-2 | 25 μs Cat-2 |
| 100 | 16 μs Cat-2 | 25 μs Cat-2 | 25 μs Cat-2 |
| 101 | 25 μs Cat-2 | 16 μs Cat-2 | 25 μs Cat-2 |
| 110 | 25 μs Cat-2 | 25 μs Cat-2 | 25 μs Cat-2 |
| 111 | Reserved | Reserved | Reserved |

The method for transmitting information in the embodiments of the disclosure will be described below in detail still with reference to FIG. 7. The COT includes two UL bursts. The UE, after receiving the first indication information, determines the target channel access manner group according to the first indication information. For example, the first indication information received by the UE is "001", and thus it is determined that the target channel access manner group is {Cat-1, 16 μs Cat-2, 25 μs Cat-2}. If the target UL signal or target UL channel of the UE is in a first UL burst, the UE determines that the channel access manner for the target UL signal or the target UL channel is Cat-1 LBT. If the target UL signal or target UL channel of the UE is in a second UL burst, the UE determines that the channel access manner for the target UL signal or the target UL channel is 16 μs Cat-2 LBT.

The method for transmitting information in the embodiments of the disclosure will be described in detail still with reference to FIG. 8. The COT includes three UL bursts. The UE, after receiving the first indication information, determines the target channel access manner group according to the first indication information. For example, the first indication information received by the UE is "001", and thus it is determined that the target channel access manner group is {Cat-1, 16 μs Cat-2, 25 μs Cat-2}. If the target UL signal or target UL channel of the UE is in a first UL burst, the UE determines that the channel access manner for the target UL signal or the target UL channel is Cat-1 LBT. If the target UL signal or target UL channel of the UE is in a second UL burst, the UE determines that the channel access manner for the target UL signal or the target UL channel is 16 μs Cat-2 LBT. If the target UL signal or target UL channel of the UE is in a third UL burst, the UE determines that the channel access manner for the target UL signal or the target UL channel is 25 μs Cat-2 LBT.

In some embodiments, the control information (at least including the first indication information) may indicate a channel access manner corresponding to at least one burst in the COT. Therefore, the UE scheduled to implement transmission by use of the first channel access type such as Cat-4 LBT, after receiving the control information and determining that the target signal or the target channel (for example, the target UL signal or the target UL channel or a target sidelink signal or a target sidelink channel) is in the COT, may switch a channel access type from the first channel access type to the second channel access type. The first channel access type may be Cat-4 LBT, and the second channel access type may be Cat-2 LBT.

In some embodiments, the network device sends the control information (at least including the first indication information) to the UE to indicate at least one gap in the COT and a channel access manner corresponding to the at least one gap. Therefore, the UE scheduled to implement transmission by use of the first channel access type (for example, Cat-4 LBT), after receiving the control information and determining that a signal to channel to be transmitted is in the COT, may switch the channel access type from the first channel access type (for example. Cat-4 LBT) to the second channel access type (for example, Cat-2 LBT).

Figure 9:
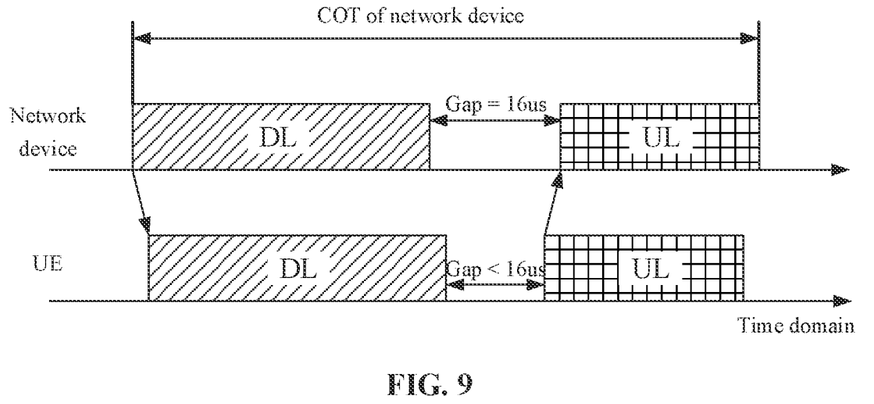
FIG. 9 is a schematic diagram of a gap reserved by a network device and a gap determined by UE according to an embodiment of the disclosure.

The disclosure also provides an implementation method for the second channel access type. The second channel access type includes the second channel access type based on the first detection interval and/or the second channel access type based on the second detection interval. The second channel access type may be Cat-2 LBT, a gap size of the first detection interval may be 25 μs, and a gap size of the second detection interval may be 16 μs. Normally, the network device may ensure that a gap between two bursts is one of the above two values. Specifically, this may be implemented by adopting manners such as transmitting an occupancy signal, symbol puncturing, instructing the UE for advanced sending and the like. However, for the UE, considering a DL transmission delay and a timing advance for UL sending, a size of a gap determined by the UE may be smaller than a size of the gap reserved by the network device. FIG. 9 is a schematic diagram showing the gap reserved by the network device and the gap determined by the UE.

In an existing solution, for a UL burst in the COT of the network device, if a gap between a starting position of the UL burst and an ending position of a DL burst is smaller than 16 μs, the UE may perform UL transmission immediately after the gap ends. However, in practice, even though the network device reserves a 16 μs gap between the starting position of the UL burst and the ending position of the DL burst, the size of the gap determined by the UE may still be smaller than 16 μs. Therefore, the UE may determine the channel access manner according to the indication from the network device or a preset rule rather than determine the channel access manner according to the size of the determined gap.

Optionally, the preset rule includes that: if information sent by the UE in a UL burst includes Hybrid Automatic Repeat reQuest (HARQ) acknowledgement message and/or a length of the UL burst is less than or equal to a preset value, the UE may perform UL transmission immediately after the gap ends under the condition that the gap is smaller than 16 μs. As an example, the preset value may be two symbols.

If the UE determines that the channel access manner in the COT of the network device is the second channel access type (or, Cat-2 LBT), the second channel access type may be implemented in one of the following manners.

In some possible implementations, the size of the gap at a network device side is 16 μs, and the size of the gap determined by a UE side is L1, L1<16 μs. The gap of which a length is L1 includes a first sub gap and a second sub gap, the first sub gap being before the second sub gap. The first sub gap and the second sub gap may also be called detection slots.

In a first embodiment, if energy detected during 4 μs in the second sub gap is lower than a preset threshold, it is determined that LBT succeeds, otherwise it is determined that LBT fails. The second sub gap is more than or equal to 4 μs. Optionally, the first sub gap is smaller than 7 μs, and the second sub gap is 9 μs; or, the first sub gap is 7 μs, and the second sub gap is smaller than 9 μs. Optionally, the first sub gap is more than or equal to 4 μs.

In a second embodiment, if energy detected during 4 μs in the first sub gap is lower than the preset threshold and energy detected during 4 μs in the second sub gap is lower than the preset threshold, it is determined that LBT succeeds, otherwise it is determined that LBT fails. The first sub gap is more than or equal to 4 μs, and the second sub gap is more than or equal to 4 μs. Optionally, the first sub gap is smaller than 7 μs, and the second sub gap is 9 μs; or, the first sub gap is 7 μs, and the second sub gap is smaller than 9 μs.

In a third embodiment, if energy detected during 4 μs in the gap of which the length is L1 is lower than the preset threshold, it is determined that LBT succeeds, otherwise it is determined that LBT fails.

In some other possible implementations, the size of the gap at the network device side is 25 μs, and the size of the gap determined by the UE side is L2, L2<25 μs. The gap of which the length is L2 includes a third sub gap and a fourth sub gap, the third sub gap being before the fourth sub gap. If energy detected during 4 μs in the third sub gap is lower than the preset threshold and energy detected during 4 μs in the fourth sub gap is lower than the preset threshold, it is determined that LBT succeeds, otherwise it is determined that LBT fails. The third sub gap is 9 μs, and the fourth sub gap is smaller than 16 μs: or, the third sub gap is smaller than 16 μs, and the fourth sub gap is 9 μs. The third sub gap or the fourth sub gap may also be called a detection slot.

Figure 10:
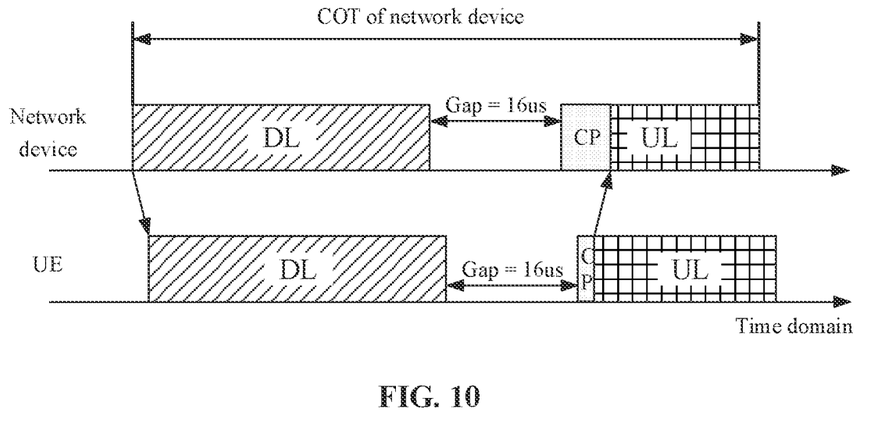
FIG. 10 is another schematic diagram of a gap reserved by a network device and a gap determined by UE according to an embodiment of the disclosure.

In some other possible implementations, the UE reserves a gap for LBT according to the indication from the network device or the preset rule. For example, the network device instructs the UE to perform a second channel access type based on the second detection interval. As shown in FIG. 10, the UE determines a time length between a starting moment of UL transmission and a starting moment of a first symbol containing valid data in a UL burst is L3, L3 being more than or equal to 0. A resource in the time length L3 may be configured for the UE to send an occupancy signal. For example, the UE may send a Cyclic Prefix (CP) extension part of the first symbol containing the valid data. Optionally, a time length for the UE to send the CP extension part is L4, L4 being more than or equal to 0 and L4 being less than or equal to L3. That is, the UE may perform the second channel access type by use of the second detection interval, namely at least part of length in the time length L3 may be used to reduce the influence of the DL transmission delay and the timing advance for UL sending.

Through each implementation for implementing the second channel access type, channel access under a condition of a variable gap size may be implemented. Moreover, the UE determines the channel access manner according to the indication from the network device or the preset rule rather than determines the channel access manner according to the size of the gap determined by the UE itself, so that the inconsistency between the network device and the UE in understanding of the channel access manner is avoided.

Figure 11:
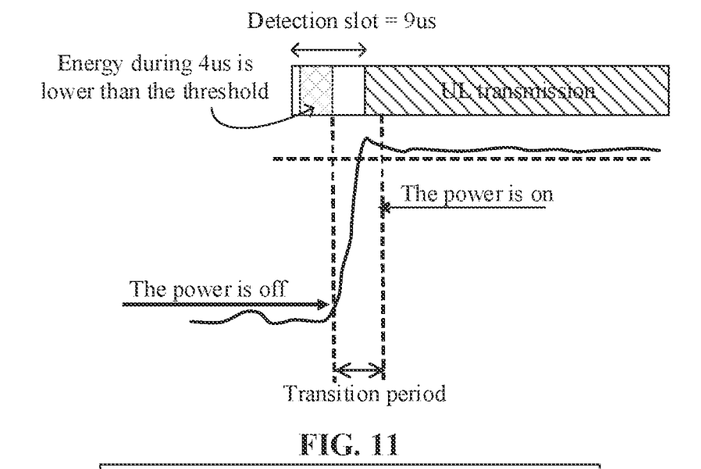
FIG. 11 is a schematic diagram of a transition period of UE according to an embodiment of the disclosure.

The disclosure also provides an implementation method for adjusting transmit power of the UE from an off state to an on state. If the UE determines that energy detected during 4 μs, for example, any 4 μs, in a last detection slot in an LBT process is lower than the preset threshold, the transmit power may be switched from the off state to the on state in the detection slot after energy detection for the 4 μs is ended. There is made such a hypothesis that time for adjusting the transmit power of the UE from the off state to the on state is a transition period. If a length of the last detection slot in the LBT process of the UE is, for example, 9 μs, a schematic diagram of the transition period of the UE is shown in FIG. 11.

The method for transmitting information provided in the embodiments of the disclosure includes that: the UE receives the first indication information from the network device, the first indication information being used to determine the at least one channel access manner in the COT of the network device; and the UE determines the first channel access manner for the target burst in the COT according to the first indication information. Therefore, after the UE scheduled to implement transmission by a first channel access type (for example, Cat-4 LBT) receives the first indication information and determines that a signal or channel to be transmitted is inside the COT, the UE may determine an LBT type required to be used for a UL burst in the COT of the network device and further switch a channel access type from the first channel access type (for example, Cat-4 LBT) to a second channel access type (For example, Cat-2 LBT).

It is to be understood that, in each embodiment of the disclosure, a magnitude of a sequence number of each process does not mean an execution sequence and the execution sequence of each process should be determined by its function and an internal logic and should not form any limit to an implementation process of the embodiments of the disclosure.

Figure 12:
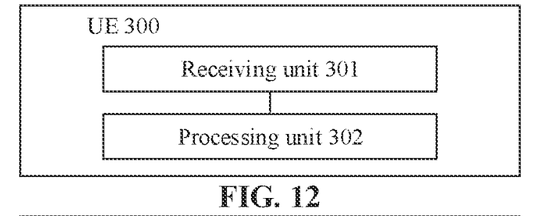
FIG. 12 is a composition structure diagram of UE according to an embodiment of the disclosure.

For implementing the method in the abovementioned embodiments, the embodiments of the disclosure also provide a UE. As shown in FIG. 12, a composition structure of the UE 300 includes a receiving unit 301 and a processing unit 302.

The receiving unit 301 is configured to receive a first indication information from a network device. The first indication information is used to determine at least one channel access manner in COT of the network device.

The processing unit 302 is configured to determine a first channel access manner for a target burst in the COT according to the first indication information. The target burst is used to transmit a target signal or a target channel.

In some embodiments, the first indication information being used to determine the at least one channel access manner in the COT includes the following aspect.

The first indication information is used to determine a target channel access manner group, the target channel access manner group being used to determine the at least one channel access manner in the COT.

In some embodiments, the target channel access manner group is determined according to a first parameter.

The first parameter includes at least one of: at least one channel access manner in the target channel access manner group, a number of the channel access manners in the target channel access manner group or a maximum number of the channel access manners in the target channel access manner group. The first parameter is configured by a high layer or preset.

In some embodiments, the target channel access manner group is a channel access manner group in a set of channel access manner groups, the set of channel access manner groups including at least one channel access manner group.

In some embodiments, the set of channel access manner groups is determined according to a second parameter.

The second parameter includes at least one of: at least one channel access manner group in the set of channel access manner groups, a number of the channel access manner groups in the set of channel access manner groups or a maximum number of the channel access manner groups in the set of channel access manner groups. The second parameter is configured by the high layer or preset.

In some embodiments, the set of channel access manner groups includes at least two channel access manner groups, and each channel access manner group in the at least two channel access manner groups includes the same number of channel access manners.

In some embodiments, the at least one channel access manner includes a channel access manner for at least one burst in the COT, and the at least one burst includes at least one of:

at least one UL burst in the COT;
all UL bursts in the COT;
at least one sidelink burst in the COT;
all sidelink bursts in the COT;
at least one burst, except a first burst, in the COT; or
all remaining bursts, except the first burst, in the COT.

In some embodiments, the target burst is an ith burst in the at least one burst, and the first channel access manner is an ith channel access manner in the at least one channel access manner, i being an integer.

In some embodiments, the receiving unit is further configured to receive a second indication information from the network device. The second indication information is used to determine at least one burst in the COT and the at least one burst includes the target burst.

In some embodiments, the second indication information is used to determine at least one of:

a starting symbol of the target burst and/or a starting position in the starting symbol;
an ending symbol of the target burst and/or an ending position in the ending symbol;
a position of the target burst in the COT;
a duration of the target burst;
a first length, the first length including a time distance between a symbol for transmitting the second indication information and the starting symbol of the target burst; or
a second length, the second length including a time distance between an ending symbol of a burst for transmitting the second indication information and the starting symbol of the target burst.

In some embodiments, information indicated by the second indication information is determined according to a first subcarrier spacing, the first subcarrier spacing being less than or equal to a subcarrier spacing corresponding to the target burst.

In some embodiments, the number of the bursts in the COT is indicated by a physical layer or configured by the high layer.

And/or, the maximum number of the bursts in the COT is configured by the high layer or preset.

In some embodiments, the receiving unit is further configured to receive a third indication information from the network device before the COT starts. The third indication information is used to determine that a channel access manner for the target burst is a second channel access manner and the second channel access manner is different from the first channel access manner.

In some embodiments, the first channel access manner includes one of:

a first channel access manner of a second channel access type, a second channel access manner of the second channel access type or a third channel access type.

In some embodiments, the first indication information is further used to determine at least one channel access manner outside the COT.

Figure 13:
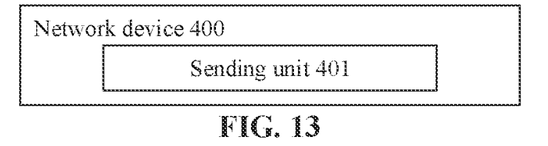
FIG. 13 is a composition structure diagram of a network device according to an embodiment of the disclosure.

For implementing the method for transmitting information, the embodiments of the disclosure also provide a network device. As shown in FIG. 13, a composition structure of the network device 400 includes a sending unit 401.

In some embodiments, the sending unit 401 is configured to send a first indication information to UE. The first indication information is used for the UE to determine at least one channel access manner in COT of the network device.

In some embodiments, the first indication information being used to determine the at least one channel access manner in the COT includes the following aspect.

The first indication information is used to determine a target channel access manner group. The target channel access manner group is used to determine the at least one channel access manner in the COT.

In some embodiments, the target channel access manner group is determined according to a first parameter.

The first parameter includes at least one of: at least one channel access manner in the target channel access manner group, the number of the channel access manners in the target channel access manner group or the maximum number of the channel access manners in the target channel access manner group. The first parameter is configured by a high layer or preset.

In some embodiments, the target channel access manner group is a channel access manner group in a set of channel access manner groups. The set of channel access manner groups includes at least one channel access manner group.

In some embodiments, the set of channel access manner groups is determined according to a second parameter.

The second parameter includes at least one of: at least one channel access manner group in the set of channel access manner groups, the number of the channel access manner groups in the set of channel access manner groups or the maximum number of the channel access manner groups in the set of channel access manner groups. The second parameter is configured by the high layer or preset.

In some embodiments, the set of channel access manner groups includes at least two channel access manner groups, and each channel access manner group in the at least two channel access manner groups includes the same number of channel access manners.

In some embodiments, the at least one channel access manner includes a channel access manner for at least one burst in the COT, and the at least one burst includes at least one of:

at least one UL burst in the COT;
all UL bursts in the COT;
at least one sidelink burst in the COT;
all sidelink bursts in the COT;
at least one burst, except a first burst, in the COT; or
all remaining bursts, except the first burst, in the COT.

In some embodiments, the target burst is an ith burst in the at least one burst, and the first channel access manner is an ith channel access manner in the at least one channel access manner, i being an integer.

In some embodiments, the receiving unit is further configured to receive a second indication information from the network device. The second indication information is used to determine at least one burst in the COT and the at least one burst includes the target burst.

In some embodiments, the second indication information is used to determine at least one of:

a starting symbol of the target burst and/or a starting position in the starting symbol;

an ending symbol of the target burst and/or an ending position in the ending symbol;

a position of the target burst in the COT;

a duration of the target burst;

a first length, the first length including a time distance between a symbol for transmitting the second indication information and the starting symbol of the target burst; or a second length, the second length including a time distance between an ending symbol of a burst for transmitting the second indication information and the starting symbol of the target burst.

In some embodiments, information indicated by the second indication information is determined according to a first subcarrier spacing, the first subcarrier spacing being less than or equal to a subcarrier spacing corresponding to the target burst.

In some embodiments, the number of the bursts in the COT is indicated by a physical layer or configured by the high layer.

And/or, the maximum number of the bursts in the COT is configured by the high layer or preset.

In some embodiments, the receiving unit is further configured to receive third indication information from the network device before the COT starts. The third indication information is used to determine that a channel access manner for the target burst is a second channel access manner and the second channel access manner is different from the first channel access manner.

In some embodiments, the first channel access manner includes one of: a first channel access manner of a second channel access type, a second channel access manner of the second channel access type or a third channel access type.

In some embodiments, the first indication information is further used to determine at least one channel access manner outside the COT.

The embodiments of the disclosure also provide a UE, which includes a processor and a memory for storing a computer program capable of running in the processor. The processor is configured to run the computer program to execute the steps of the method for transmitting information executed by the UE.

The embodiments of the disclosure also provide a network device, which includes a processor and a memory for storing a computer program capable of running in the processor. The processor is configured to run the computer program to execute the steps of the method for transmitting information executed by the network device.

Figure 14:
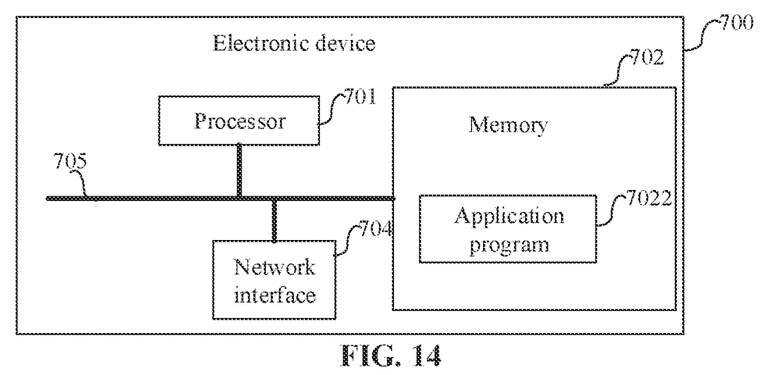
FIG. 14 is a hardware composition structure diagram of an electronic device according to an embodiment of the disclosure.

FIG. 14 is a hardware composition structure diagram of an electronic device (UE or a network device) according to an embodiment of the disclosure. The electronic device 700 includes at least one processor 701, a memory 702 and at least one network interface 704. Each component in the electronic device 700 is coupled together through a bus system 705. It can be understood that the bus system 705 is used to implement connection communication between these components. The bus system 705 includes a data bus and further includes a power bus, a control bus and a state signal bus. However, for clear description, various buses in FIG. 14 are marked as the bus system 705.

It can be understood that the memory 702 may be a volatile memory or a nonvolatile memory, and may also include both of the volatile and nonvolatile memories. The nonvolatile memory may be a Read Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory, a compact disc or a Compact Disc Read-Only Memory (CD-ROM). The magnetic surface memory may be a disk memory or a tape memory. The volatile memory may be a Random Access Memory (RAM), and is used as an external high-speed cache. It is exemplarily but unlimitedly described that RAMs in various forms may be adopted, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM) and a Direct Rambus Random Access Memory (DRRAM). The memory 702 described in the embodiment of the disclosure is intended to include, but not limited to, memories of these and any other proper types.

In the embodiment of the disclosure, the memory 702 is configured to store various types of data to support the operation of the electronic device 700. Examples of the data include any computer program, for example, an application program 7022, operated in the electronic device 700. A program for implementing the method in the embodiments of the disclosure may be included in the application program 7022.

The method disclosed in the embodiments of the disclosure may be applied to the processor 701 or implemented by the processor 701. The processor 701 may be an integrated circuit chip with a signal processing capability. In an implementation process, each step of the method may be completed by an integrated logic circuit in a hardware form in the processor 701 or an instruction in a software form. The processor 701 may be a universal processor, a Digital Signal Processor (DSP) or another Programmable Logic Device (PLD), a discrete gate or transistor logic device, a discrete hardware component and the like. The processor 701 may be configured to implement or execute each method, step and logical block diagram disclosed in the embodiments of the disclosure. The universal processor may be a microprocessor, any conventional processor or the like. The steps of the method disclosed in combination with the embodiments of the disclosure may be directly embodied to be executed and completed by a hardware decoding processor or executed and completed by a combination of software modules and the hardware in the decoding processor. The software module may be located in a storage medium, and the storage medium is located in the memory 702. The processor 701 reads information in the memory 702 and completes the steps of the method in combination with the hardware thereof.

In an exemplary embodiment, the electronic device 700 may be implemented by one or more Application Specific Integrated Circuits (ASICs), DSPs, PLDs, Complex Programmable Logic Devices (CPLDs), Field Programmable Gate Arrays (FPGAs), universal processors, controllers, Micro Controller Units (MCUs), Microprocessor Units (MPUs) or other electronic components, and is configured to execute the abovementioned method.

The embodiments of the disclosure also provide a storage medium, which is configured to store a computer program.

Optionally, the storage medium may be applied to UE in the embodiments of the disclosure, and the computer program enables a computer to execute corresponding flows in each method in the embodiments of the disclosure. For simplicity, elaborations are omitted herein.

The disclosure is described with reference to flowcharts and/or block diagrams of the method, device (system) and computer program product according to the embodiments of the disclosure. It is to be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of another programmable data processing device to generate a machine, so that a device for implementing a function specified in one flow or multiple flows in the flowcharts and/or one block or multiple blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including instruction means may be generated by the instructions stored in the computer-readable memory. The instruction means is used to implement the function specified in one flow or multiple flows in the flowcharts and/or one block or multiple blocks in the block diagrams.

These computer program instructions may further be loaded onto the computer or the other programmable data processing device, so that a series of operating steps are executed on the computer or the other programmable data processing device to generate processing implemented by the computer, and steps for implementing the function specified in one flow or multiple flows in the flowcharts and/or one block or multiple blocks in the block diagrams are provided by the instructions executed on the computer or the other programmable data processing device.

Described above are merely preferred embodiments of the disclosure and not intended to limit the scope of protection of the disclosure. Any modifications, equivalent replacements, improvements and the like made within the spirit and principle of the disclosure shall fall within the scope of protection of the disclosure.

The invention claimed is:

1. A method for transmitting information, comprising:
receiving, by User Equipment (UE), first indication information from a network device, wherein the first indication information is used to determine at least one channel access manner in Channel Occupancy Time (COT) of the network device, wherein the COT is obtained by the network device according to a Frame Based Equipment (FBE) based channel access manner, wherein the first indication information being used to determine the at least one channel access manner in the COT comprises that:
 the first indication information is used to determine a target channel access manner group, the target channel access manner group being used to determine the at least one channel access manner in the COT; and
determining, by the UE, a first channel access manner for a target burst in the COT according to the first indication information, wherein the target burst is used to transmit a target signal or a target channel; and
receiving, by the UE, second indication information, wherein the second indication information is used to determine a starting symbol of the target burst and a starting position in the starting symbol, wherein the first indication information is communicated via a first control information, and wherein the second indication information is communicated via a second control information, wherein the second indication information is used to determine at least one burst in the COT and the at least one burst comprises the target burst, and wherein the second indication information is used to determine a starting position in a starting symbol of the target burst.

2. The method of claim 1, wherein the target channel access manner group is determined according to a first parameter, and the first parameter comprises:
at least one channel access manner in the target channel access manner group.

3. The method of claim 2, wherein the first parameter is preset.

4. The method of claim 1, wherein the target channel access manner group is a channel access manner group in a set of channel access manner groups, the set of channel access manner groups comprising at least one channel access manner group.

5. The method of claim 4, wherein the set of channel access manner groups is determined according to a second parameter, and the second parameter comprises:
a number of the channel access manner groups in the set of channel access manner groups.

6. The method of claim 5, wherein the second parameter is configured by a higher layer or preset.

7. The method of claim 1, wherein the at least one channel access manner comprises a channel access manner for the at least one burst in the COT, and the at least one burst comprises:
at least one Uplink (UL) burst in the COT.

8. The method of claim 1, wherein information indicated by the second indication information is determined according to a first subcarrier spacing, and the first subcarrier spacing is less than or equal to a subcarrier spacing corresponding to the target burst.

9. The method of claim 1, wherein the first indication information is further used to determine at least one channel access manner outside the COT.

10. The method of claim 1, wherein:
the target channel access manner group is a channel access manner group in a set of channel access manner groups;
the set of channel access manner groups is determined according to a second parameter, and the second parameter comprises a number of the channel access manner groups in the set of channel access manner groups; and
the number of the channel access manner groups is associated with a specified sequence of channel access types sorted in order by channel access manner.

11. The method of claim 10, wherein the specified sequence of channel access types comprises a sequence of three channel access types.

12. A User Equipment (UE), comprising:
a processor;
a memory for storing a computer program executable by the processor; and
a network interface, wherein the processor is configured to run the computer program to:
control the network interface to receive first indication information from a network device, wherein the first indication information is used to determine at least one channel access manner in Channel Occupancy Time (COT) of the network device, wherein the COT is obtained by the network device according to a Frame Based Equipment (FBE) based channel access manner, wherein the first indication information being used to determine the at least one channel access manner in the COT comprises that:
the first indication information is used to determine a target channel access manner group, the target channel access manner group being used to determine the at least one channel access manner in the COT;
determine a first channel access manner for a target burst in the COT according to the first indication information, wherein the target burst is used to transmit a target signal or a target channel, wherein the first indication information is communicated via a first control information; and
receiving, by the UE, second indication information, wherein the second indication information is used to determine a starting symbol of the target burst and a starting position in the starting symbol, wherein the second indication information is communicated via a second control information, wherein the second indication information is used to determine at least one burst in the COT and the at least one burst comprises the target burst, and wherein the second indication information is used to determine a starting position in a starting symbol of the target burst.

13. The UE of claim 12, wherein the target channel access manner group is determined according to a first parameter, and the first parameter comprises:
at least one channel access manner in the target channel access manner group.

14. The UE of claim 13, wherein the first parameter is preset.

15. The UE of claim 12, wherein the target channel access manner group is a channel access manner group in a set of channel access manner groups, the set of channel access manner groups comprising at least one channel access manner group.

16. The UE of claim 15, wherein the set of channel access manner groups is determined according to a second parameter, and the second parameter comprises:
a number of the channel access manner groups in the set of channel access manner groups.

17. The UE of claim 16, wherein the second parameter is configured by a higher layer or preset.

18. The UE of claim 12, wherein the at least one channel access manner comprises a channel access manner for the at least one burst in the COT, and the at least one burst comprises:
at least one Uplink (UL) burst in the COT.

19. The UE of claim 12, wherein information indicated by the second indication information is determined according to a first subcarrier spacing, and the first subcarrier spacing is less than or equal to a subcarrier spacing corresponding to the target burst.

20. The UE of claim 12, wherein the first indication information is further used to determine at least one channel access manner outside the COT.

21. A method for transmitting information, comprising:
receiving, by User Equipment (UE), first indication information from a network device, wherein the first indication information is used to determine at least one channel access manner in Channel Occupancy Time (COT) of the network device, wherein the first indication information being used to determine the at least one channel access manner in the COT comprises that:
the first indication information is used to determine a target channel access manner group, the target channel access manner group being used to determine the at least one channel access manner in the COT; and
determining, by the UE, a first channel access manner for a target burst in the COT according to the first indication information, wherein the target burst is used to transmit a target signal or a target channel; and
receiving, by the UE, second indication information, wherein the second indication information is used to determine a starting symbol of the target burst and a starting position in the starting symbol, wherein the first indication information is communicated via a first control information, and wherein the second indication information is communicated via a second control information, wherein:
the target channel access manner group is a channel access manner group in a set of channel access manner groups;
the set of channel access manner groups is determined according to a second parameter, and the second parameter comprises a number of the channel access manner groups in the set of channel access manner groups;
the number of the channel access manner groups is associated with a specified sequence of channel access types sorted in order by channel access manner;
the set of channel access manner groups comprises a plurality of channel access manner groups;
the plurality of channel access manner groups comprises the target channel access manner group;
each respective channel access manner group of the plurality of channel access manner groups comprises at least two channel access manners; and
each respective channel access manner group of the plurality of channel access manner groups has the same number of channel access manners.

* * * * *